(12) United States Patent
Kohara et al.

(10) Patent No.: US 10,873,725 B2
(45) Date of Patent: Dec. 22, 2020

(54) DISPLAY CONTROL DEVICE

(71) Applicant: DENSO CORPORATION, Kariya (JP)

(72) Inventors: Kenji Kohara, Kariya (JP); Hirohiko Yanagawa, Kariya (JP); Akihiro Sunasaka, Kariya (JP); Satoshi Hoshi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/340,847

(22) PCT Filed: Oct. 5, 2017

(86) PCT No.: PCT/JP2017/036307
§ 371 (c)(1),
(2) Date: Apr. 10, 2019

(87) PCT Pub. No.: WO2018/070338
PCT Pub. Date: Apr. 19, 2018

(65) Prior Publication Data
US 2019/0246068 A1 Aug. 8, 2019

(30) Foreign Application Priority Data
Oct. 14, 2016 (JP) ................. 2016-202516

(51) Int. Cl.
*H04N 7/18* (2006.01)
*B60R 1/00* (2006.01)

(52) U.S. Cl.
CPC ............. *H04N 7/18* (2013.01); *B60R 1/00* (2013.01); *B60R 2300/303* (2013.01); *B60R 2300/607* (2013.01); *B60R 2300/80* (2013.01)

(58) Field of Classification Search
CPC ...... H04N 7/18; B60R 1/00; B60R 2300/303; B60R 2300/607; B60R 2300/80
See application file for complete search history.

(56) References Cited

U.S. PATENT DOCUMENTS

| 8,384,782 B2 | 2/2013 | Hiroshi |
| 10,282,074 B2 | 5/2019 | Murad et al. |

(Continued)

FOREIGN PATENT DOCUMENTS

| DE | 102005051777 | 6/2006 |
| JP | 2004-336613 A | 11/2004 |
| JP | 2004336613 A | 11/2004 |

*Primary Examiner* — Mishawn N. Hunter
(74) *Attorney, Agent, or Firm* — Maschoff Brennan

(57) ABSTRACT

An image processing unit repeatedly acquires a captured bird's-eye image which is obtained by bird's-eye conversion of a captured image of the surroundings of a vehicle. An image processing unit acquires a history image that is a bird's-eye image corresponding to a predetermined area in front in the traveling direction at each timing determined according to a predetermined condition. The image processing unit acquires a history image at every predetermined first cycle if an unstable condition related to a behavior of the vehicle is not satisfied. If an unstable condition is satisfied, the history image is acquired at a later timing than the first cycle. The image processing unit creates a bird's-eye image for display by extracting an area corresponding to a non-imaging area of the latest captured bird's-eye image from among the accumulated history images, and combining the extracted area with the non-imaging area.

6 Claims, 4 Drawing Sheets

(56) References Cited

U.S. PATENT DOCUMENTS

| | | | |
|---|---|---|---|
| 2006/0274147 A1 | 12/2006 | Chinomi et al. | |
| 2007/0057816 A1* | 3/2007 | Sakakibara | B62D 15/027 |
| | | | 340/932.2 |
| 2013/0322688 A1* | 12/2013 | Tsuchiya | G08G 1/167 |
| | | | 382/103 |
| 2015/0070394 A1* | 3/2015 | Yanagawa | G06T 3/0018 |
| | | | 345/649 |
| 2015/0258936 A1* | 9/2015 | Takaki | B60R 1/00 |
| | | | 348/148 |
| 2015/0310285 A1* | 10/2015 | Ogata | B60R 1/00 |
| | | | 382/104 |
| 2016/0150189 A1* | 5/2016 | Kriel | H04N 7/181 |
| | | | 348/148 |
| 2016/0203606 A1* | 7/2016 | Arata | G06T 7/80 |
| | | | 348/148 |
| 2016/0243955 A1* | 8/2016 | Yoshida | B62D 15/028 |

* cited by examiner

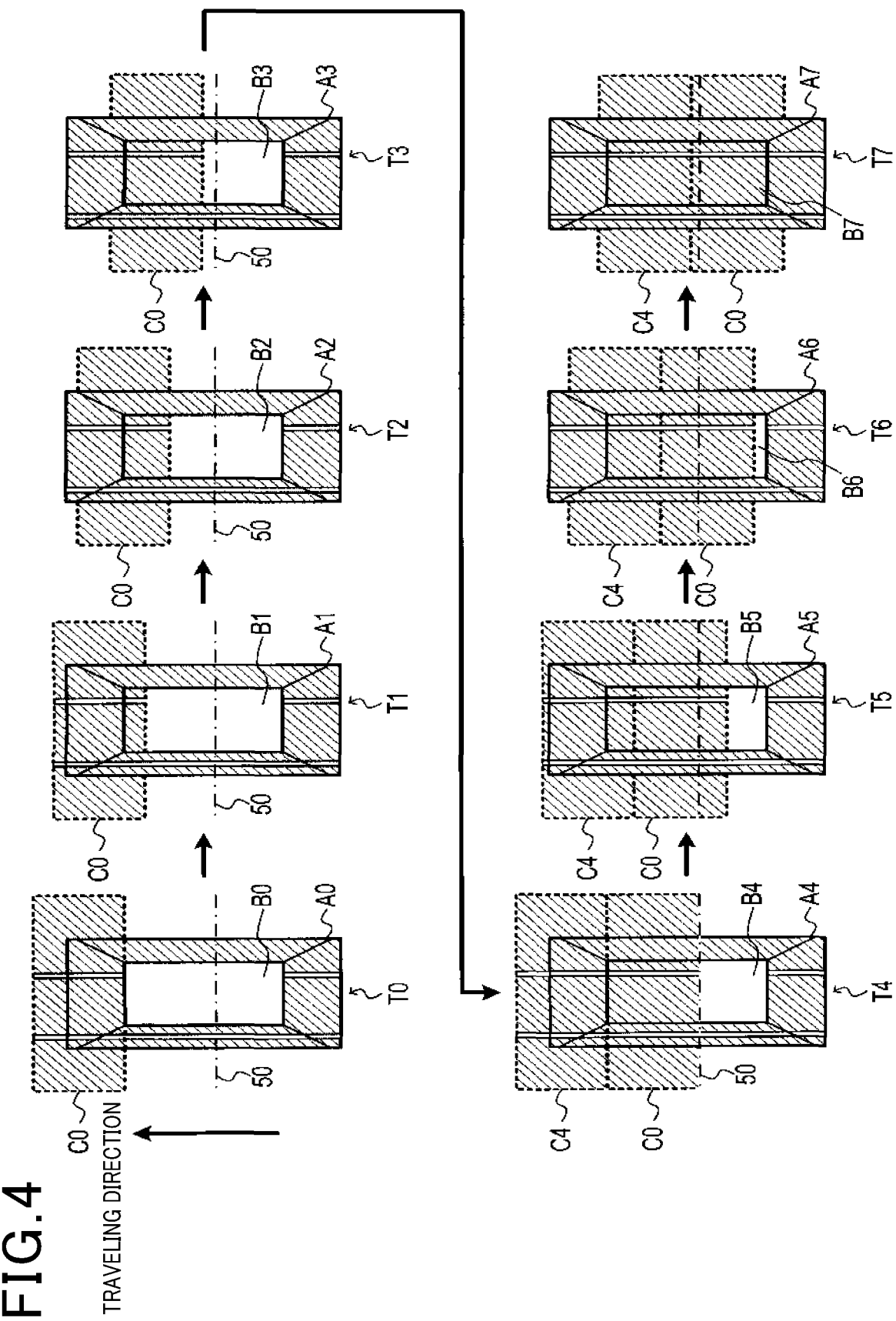

DISPLAY CONTROL DEVICE

INCORPORATION BY REFERENCE

This application is a national stage application of PCT Application No. PCT/JP2017/036307, filed on Oct. 5, 2017, which claims the benefit of priority from Japanese Patent Application No. 2016-202516 filed with Japan Patent Office on Oct. 14, 2016, the entire contents of which are hereby incorporated by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a display control device that causes an image of surroundings of a vehicle to be displayed on a display device.

BACKGROUND ART

There is known a technique of capturing an image of surroundings of a vehicle (in other words, a host vehicle) by a camera attached to the vehicle, converting that captured image into a bird's-eye image that is an image of a viewpoint looking down from above the host vehicle, and displaying that bird's-eye image on a display device provided inside the vehicle.

Moreover, Patent Literature 1 describes a technique of supplementing information of a road surface on the underneath side of a host vehicle that is not included in an imaging region of a camera by using an image captured in the past. More specifically, a moving area that is out of the field of view of a bird's-eye image (in other words, a real image) acquired at the present time is extracted from a bird's-eye image (in other words, the history image) acquired in the past. Then, the moving area of the history image is shifted by just the amount of movement of the vehicle and is rendered on the real image, whereby a synthesized bird's-eye image is created.

CITATION LIST

Patent Literature

Patent Literature 1: JP 2004-336613 A

SUMMARY OF THE INVENTION

According to a technique described in Patent Literature 1, every time an image captured by a camera is acquired, a process of extracting a moving area of a history image between two bird's-eye images continuous in time is repeated. In other words, every time an image is inputted from a camera, the history image is updated. Then, a new moving area extracted from the updated history image is rendered on the real image. In addition, in a case where a non-imaging area deviating from the imaging region of the camera covers a wide region, moving areas respectively extracted from a plurality of history images captured at different times are joined in time series, whereby a synthesized bird's-eye image is created.

However, as a result of detailed examination by the inventors, the following problems have been found with regard to the above-described prior art. For example, when a vehicle travels on an uneven road such as a gravel road or stone pavement, the vehicle shakes and the behavior becomes unstable. As the behavior of the vehicle becomes unstable, the position of the camera with respect to the ground changes from time to time, and the appearance of the road surface captured by the camera changes. Then, the road surface appearing in the moving area extracted from the history image may not be continuously joined to the road surface appearing in a real image or in the moving area extracted at other timing. As a result, the road surface is discontinuously rendered in the synthesized bird's-eye image. The inventors found that the problem in which the road surface is discontinuously rendered in the synthesized bird's-eye image noticeably appears when the history image is updated each time an image is inputted from the camera.

One aspect according to the present disclosure is to preferably provide a technique suitable for creating a synthesized bird's-eye image using history images captured in the past in a situation where a behavior of a vehicle is unstable.

A display control device according to one embodiment of the present disclosure includes a captured image acquiring unit, a bird's-eye converting unit, a history image acquiring unit, a history image storage unit, a movement amount calculating unit, a display image creating unit, a display processing unit, and a determining unit. The captured image acquiring unit is configured to periodically acquire captured images that are images captured of a predetermined imaging region surrounding a vehicle by cameras mounted on a vehicle. The bird's-eye view converting unit is configured to sequentially create captured bird's-eye images that are bird's-eye views of the surroundings of the vehicle by performing bird's-eye view conversion on captured images periodically acquired by the captured image acquiring unit. The history image acquiring unit is configured to acquire a history image that is a bird's-eye image corresponding to a predetermined area ahead in the traveling direction of the vehicle, among the captured images acquired by the captured image acquiring unit, at each timing determined according to a predetermined condition.

The history image storage unit is configured to store at least one history image acquired by the history image acquiring unit. The movement amount calculating unit is configured to calculate a movement amount of the vehicle based on information representing a behavior of the vehicle. The display image creating unit extracts an area corresponding to a non-imaging area of a captured bird's-eye image acquired at the present time from the history images stored in the history image storage unit based on the movement amount of the vehicle. The display image creating unit is configured to create a display bird's-eye image as a bird's-eye image for display by combining the extracted area with the non-imaging area. The display processing unit is configured to display the display bird's-eye image created by the display image creating unit on a display device provided in the vehicle.

The determining unit is configured to determine whether a behavior of the vehicle corresponds to a specific unstable state based on state information representing a state of the vehicle. Then, in a condition that is determined by the determining unit not to correspond to the unstable state, the history image acquiring unit is configured to acquire the history image from the latest captured bird's-eye image at every predetermined first cycle corresponding to a cycle during which captured images are captured by the cameras. However, in a condition that is determined by the determining unit to correspond to the unstable state, the history image acquiring unit is configured to acquire the history image from the latest captured bird's-eye image at a later timing than the first cycle.

With the display control device according to the present disclosure, in a situation where the behavior of a vehicle is unstable, the timing of updating a history image can be made later than in normal situation where the behavior of the vehicle is not unstable. In this way, the region synthesized from history images captured at the same time in a non-imaging area becomes wider than in a normal time. As a result, the number of times historical images captured at different times are joined can be reduced. Therefore, in the display bird's-eye image synthesized from the captured bird's-eye image and the history image, it is possible to suppress discontinuity of images of the road surface rendered in the non-imaging area.

BRIEF DESCRIPTION OF THE DRAWINGS

The above-described objects and other objects, features and advantages of the technique according to the present disclosure will become more apparent from the following detailed description with reference to the accompanying drawings. A summary of the drawings is as follows.

FIG. 4 is an explanatory diagram illustrating a method of synthesizing a display bird's-eye image in an unstable state.

DESCRIPTION OF EMBODIMENTS

In the following, embodiments of the technique according to the present disclosure will be described with reference to the drawings. It should be noted that the technique according to the present disclosure is not limited to the following embodiments, and can be implemented in various modes.
[Description of Configuration of a Display System]

Figure 1:
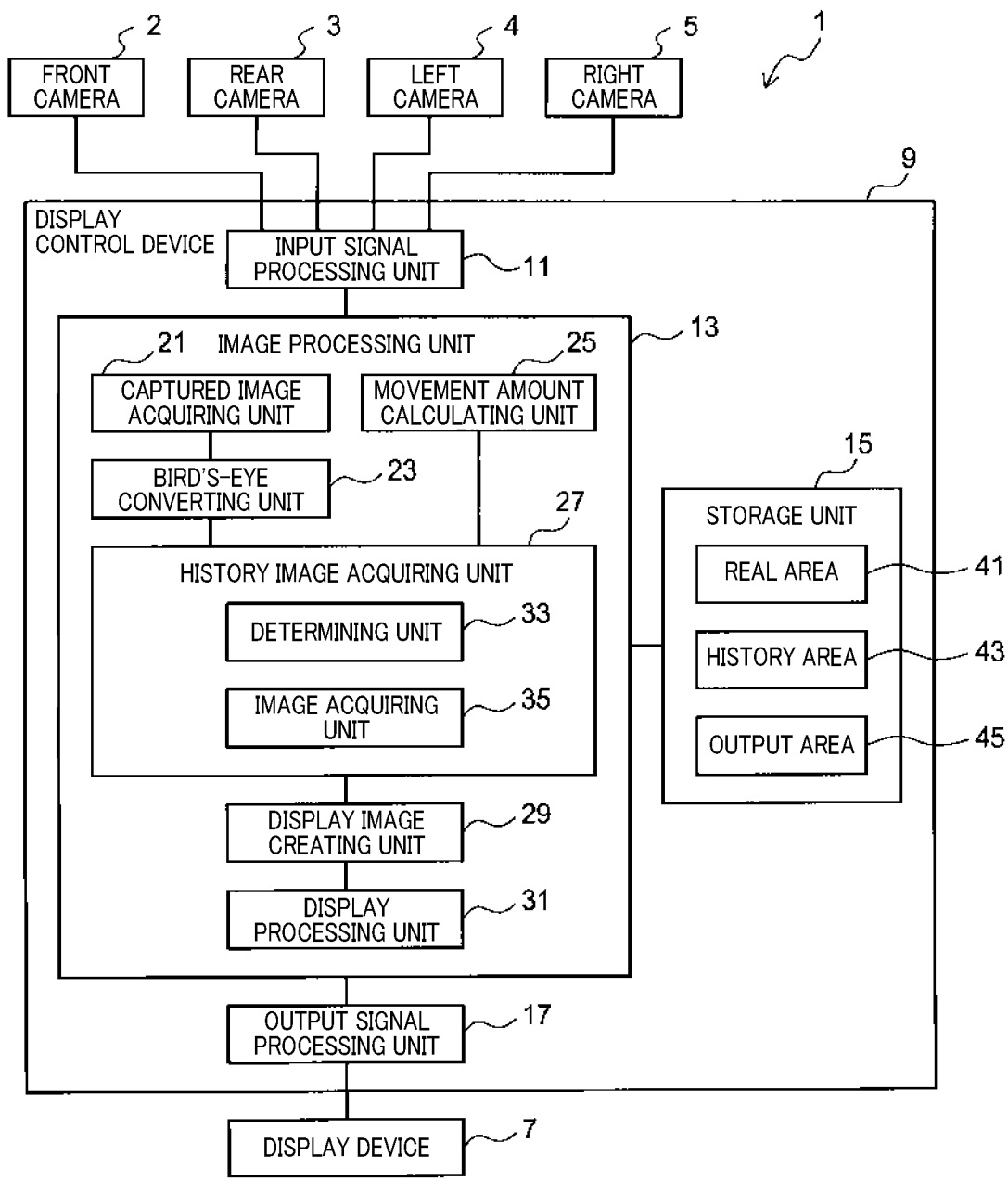
FIG. 1 is a block diagram illustrating a configuration of a display system.

A configuration of a display system 1 including a display control device 9 as an embodiment of a technique according to the present disclosure will be described with reference to FIG. 1. The display system 1 is an in-vehicle device that displays a captured image of the surroundings of the vehicle. As illustrated in FIG. 1, the display system 1 includes four cameras 2, 3, 4 and 5, a display device 7, and a display control device 9. Each of the cameras 2 to 5 and the display device 7 are connected to the display control device 9. Hereinafter, a vehicle in which the display system 1 is mounted will be referred to as a "host vehicle".

The four cameras 2 to 5 are fixed and mounted on the front, rear, left, and right of the host vehicle as a front camera 2, a rear camera 3, a left camera 4, and a right camera 5, respectively. Each of the cameras 2 to 5 is arranged so as to be able to capture the entire surroundings of the host vehicle, with the front, rear, left side, and right side of the vehicle as the respective imaging regions. However, the road surface hidden underneath the host vehicle is not included in the imaging regions of the cameras 2 to 5.

Each of the cameras 2 to 5 repeatedly captures images of the respective imaging regions at fixed time intervals (for example, 1/30 second cycle), and outputs the data of the captured images as imaging results to the display control device 9. As will be described later, the captured images outputted to the display control device 9 are converted into a bird's-eye image by the display control device 9. Incidentally, in the present embodiment, an example is described in which the cameras are provided on the front, rear, right and left sides of the host vehicle, however, examples in which cameras are provided only on the front and rear, or only on the front or the rear are also possible.

The display device 7 is a display having a function of displaying various images. The display device 7 is provided at a position where a passenger such as a driver inside the vehicle can visually recognize a displayed image. A bird's-eye image representing a region including the surroundings of the host vehicle inputted from the display control device 9 is displayed on the display device 7. Note that this bird's-eye view image displayed on the display device 7 is a display bird's-eye view image.

The display control device 9 is an electronic control device including an input signal processing unit 11, an image processing unit 13, a storage unit 15, and an output signal processing unit 17. The input signal processing unit 11 is an interface for outputting captured images that are inputted from each of the cameras 2 to 5 to the image processing unit 13.

The image processing unit 13 is an information processing device mainly including a CPU, a RAM, a ROM, a semiconductor memory such as a flash memory or the like, an input/output interface, and the like (not illustrated). The image processing unit 13 is embodied by, for example, a microcontroller or the like in which functions are integrated as a computer system. The function of the image processing unit 13 is achieved by the CPU executing programs stored in a tangible storage medium such as a ROM, a semiconductor memory, or the like. The number of microcontrollers of the image processing unit 13 may be one or more.

The image processing unit 13 includes, as constituent elements of the function, a captured image acquiring unit 21, a bird's-eye converting unit 23, a movement amount calculating unit 25, a history image acquiring unit 27, a display image creating unit 29, and a display processing unit 31. In addition, the history image acquiring unit 27 has functions as a determining unit 33 and an image acquiring unit 35. Incidentally, the method of achieving these elements constituting the image processing unit 13 is not limited to software, and part or all of the elements may be achieved by using hardware that combines logic circuits, analog circuits, and the like.

The captured image acquiring unit 21 repeatedly acquires captured images from the respective cameras 2 to 5 via the input signal processing unit 11. The bird's-eye converting unit 23 performs known bird's-eye conversion on the captured images repeatedly acquired by the captured image acquiring unit 21, and successively converts those captured images into a bird's-eye view image of a viewpoint looking down on the host vehicle from directly above or at an angle. In other words, the bird's-eye converting unit 23 successively creates a captured bird's-eye image that is a bird's-eye image of the captured images. The movement amount calculating unit 25 calculates the movement amount of the host vehicle based on shift range information inputted from the host vehicle, and vehicle behavior information that includes vehicle speed information and steering angle or yaw rate information.

The history image acquiring unit 27 extracts a partial area ahead in the traveling direction of the host vehicle as a history image from the captured bird's-eye image created by the bird's-eye view converting unit 23 at a predetermined timing according to the traveling state of the vehicle. The history image acquiring unit 27 stores the extracted history images in a time series in the history area 43 of the storage unit 15. Note that when the host vehicle is moving forward, the history image acquiring unit 27 acquires the imaging region on the front side of the host vehicle as a history image. Moreover, when the host vehicle is moving backward, the history image acquiring unit 27 acquires the imaging region on the rear side of the host vehicle as a history image.

The determining unit 33, according to the traveling state of the host vehicle, determines whether an unstable condition is satisfied that indicates that the behavior of the host vehicle is in a specific unstable state. More specifically, based on the behavior represented by the measurement results of a gyro sensor, an acceleration sensor, a vehicle height sensor, and the like provided in the host vehicle, the determining unit 33 determines that an unstable condition is satisfied in the case where the host vehicle is traveling on a bad road with many uneven areas. In addition, in the case where it is determined that the host vehicle is skidding based on the measurement result of a wheel speed sensor, the determining unit 33 determines that an unstable condition is satisfied. Alternatively, based on map data used in a navigation system or the like, in the case where the road on which the host vehicle is traveling corresponds to a bad road, the determining unit 33 may be configured to determine that an unstable condition is satisfied.

The image acquiring unit 35 extracts history images from the captured bird's-eye images at the timing according to the determination result by the determining unit 33, and stores the images in a time series in the history area 43 of the storage unit 15. More specifically, in the case where an unstable condition is not satisfied, or in other words, in a normal traveling state, the image acquiring unit 35 acquires a history image every time a captured image is acquired by the captured image acquiring unit 21 (for example, a ⅓₀ sec cycle). Hereinafter, the cycle at which the image acquiring unit 35 updates the history image in a normal state is referred to as a standard cycle.

On the other hand, in the case where an unstable condition is satisfied, in other words, in a situation where the traveling state is unstable, the image acquiring unit 35 acquires history images at time intervals longer than the standard cycle. More specifically, the image acquiring unit 35 moves the imaging region of the previously acquired history image in accordance with the movement amount of the host vehicle, and when the imaging region of the history image reaches a predetermined position, a new history image is acquired. Alternatively, the image acquiring unit 35 acquires a new history image at each time interval that is set longer than the standard cycle.

Note that the captured bird's-eye image represents the latest situation of a predetermined region in the front, rear, left and right directions of the host vehicle of the surroundings of the host vehicle. On the other hand, although the history image is not the latest situation, it is may represent a situation in a region not covered by the captured bird's-eye image such as a place underneath the host vehicle due to the movement of the host vehicle.

The storage unit 15 is a storage device for storing the above-descried captured bird's-eye image, and history images, and the display bird's-eye view image to be described later. In the storage unit 15, a real area 41, a history area 43, and an output area 45 are secured in advance as storage areas for storing various images.

The real area 41 is an area for storing the latest captured bird's-eye image created by the bird's-eye converting unit 23. The history area 43 is an area for storing the history images acquired and created by the history image acquiring unit 27. In the history area 43, a time series of history images is stored for a fixed period of time in the past from the latest history image. Incidentally, the history area 43 corresponds to a history image storage unit according to the present disclosure. The output area 45 is an area for storing a display bird's-eye image that is a bird's-eye image created by combining the history bird's-eye image and the captured image. The display bird's-eye image stored in the output area 45 is displayed on the display device 7.

The display image creating unit 29 creates a display bird's-eye image that is a bird's-eye image obtained by combining a captured bird's-eye image and a history image. In the captured bird's-eye image in which an image of the surroundings of the host vehicle is captured, since the region hidden underneath the host vehicle is not included in the imaging region of each of the cameras 2 to 3, the central portion of the captured bird's-eye image is blank. Hereinafter, this blank portion is referred to as a non-imaging area. The display image creating unit 29 extracts an area corresponding to the non-imaging area based on the movement amount of the host vehicle from the time series of the history images accumulated in the history area 43. Then, by joining the areas extracted from each history image, the display image creating unit 29 creates a supplementary image as an image of a region corresponding to the entire non-imaging area. The display image creating unit 29 then creates the display bird's-eye image by combining the created supplementary image with the non-imaging area of the latest captured bird's-eye image. The display bird's-eye image created by the display image creating unit 29 is stored in the output area 45 of the storage unit 15.

The display processing unit 31, via the output signal processing unit 17, causes the display device 7 to display the display bird's-eye image stored in the output area 45 of the storage unit 15. The image processing unit 13 executes a display control process described later, whereby the above-described functions of the captured image acquiring unit 21, the bird's-eye converting unit 23, the movement amount calculating unit 25, the history image acquiring unit 27, the display image creating unit 29, and the display processing unit 31 are achieved. The output signal processing unit 17 is an interface for outputting the display bird's-eye image created by the image processing unit 13 to the display device 7.

[Description of the Display Control Process]

The procedure of the display control process executed by the image processing unit 13 of the display control device 9 will be described with reference to the flowchart of FIG. 2. The display control process is started by issuing a predetermined instruction. The display control process is repeatedly executed each time captured images from each of the cameras 2 to 5 are inputted via the input signal processing unit 11. In other words, the display control process is executed in synchronization with the frame rate (for example, 30 frames per second) of the images captured by each of the cameras 2 to 5. Incidentally, this display control process can be applied to any case where the host vehicle is moving forward or backward.

In S100, the image processing unit 13 acquires the latest captured images that are captured by the cameras 2 to 5, one frame at a time. Note that S100 is a process executed as a function of the captured image acquiring unit 21. In step S102, the image processing unit 13 creates a captured bird's-eye image of a viewpoint looking down from above of the entire surrounding of the host vehicle by applying bird's-eye view conversion to the captured images acquired in step S100. It should be noted that S102 is a process executed as a function of the bird's-eye view converting unit 23. The captured bird's-eye image created here is stored in the real area 41 of the storage unit 15 as a real time image.

In S104, the image processing unit 13 calculates the previous movement amount of the host vehicle based on the vehicle behavior information inputted from the host vehicle. Incidentally, S104 is a process executed as a function of the movement amount calculating unit 25. More specifically, the movement amount calculating unit 25 calculates the movement amount of the host vehicle based on the shift range information, and vehicle behavior information such as vehicle speed information, the steering angle or the yaw rate information, and the like. The movement amount referred to here is a change in the position and direction of the host vehicle during a period from the acquisition timing of the previous captured image to the acquisition timing of the current captured image.

In S106, the image processing unit 13 moves the position of each history image accumulated in the history area of the storage unit 15 according to the movement amount calculated in S104. More specifically, the position of each history image is updated to the recent state by moving the relative positional relationship between the imaging region in which the history image appears and the host vehicle just the amount of movement of the host vehicle during the period from the acquisition timing of the previous captured image to the acquisition timing of the current captured image.

In S108, the image processing unit 13 determines whether an unstable condition is satisfied with respect to the behavior of the host vehicle. Note that S108 is a process executed as a function of the determining unit 33 of the history image acquiring unit 27. Here, in the case where an unstable condition is not satisfied (in other words, S108: NO), the image processing unit 13 proceeds to S114.

In S114, the image processing unit 13 extracts a portion corresponding to an area to be saved as a history image from the latest captured bird's-eye image stored in the real area 41, and saves the extracted history image in the history area 43. Here, in a case where the host vehicle is moving forward, the image processing unit 13 acquires an image corresponding to the imaging region set on the front side of the host vehicle as a history image. On the other hand, in a case where the host vehicle is moving backward, an image corresponding to the imaging region set on the rear side of the host vehicle is acquired as a history image. The image processing unit 13 saves the acquired history image as the latest history image in the time series of the history images stored in the history area 43.

In S116, the image processing unit 13 creates a display bird's eye image by combining the real-time image, which is the latest captured bird's-eye image stored in the real area 41, with each of the history images stored in the history area 43. Note that S116 is a process executed as a function of the display image creating unit 29.

Here, an example in which the display image creating unit 29 creates a display bird's-eye image in a situation where an unstable condition is not satisfied will be described with reference to FIG. 3. As illustrated in the example in FIG. 3, in the central portion of the real-time image A, which is the latest captured bird's-eye image of the surrounding of the host vehicle, there is a non-imaging area B corresponding to a portion hidden underneath the host vehicle.

On the other hand, at the time of normal traveling in which an unstable condition is not satisfied, for the captured images repeatedly inputted to the image processing unit 13, history images are acquired at every standard cycle that is the same as the frame rate of the captured images, and the history area 43 is sequentially updated. As a result, as illustrated in the example in FIG. 3, a historical image group C of time series corresponding to consecutive frames is accumulated in the history area 43. The display image creating unit 29 creates a supplementary image D corresponding to the non-imaging area B by sequentially joining partial areas corresponding to the non-imaging area B from the new history image of the accumulated history image group C.

Figure 3:
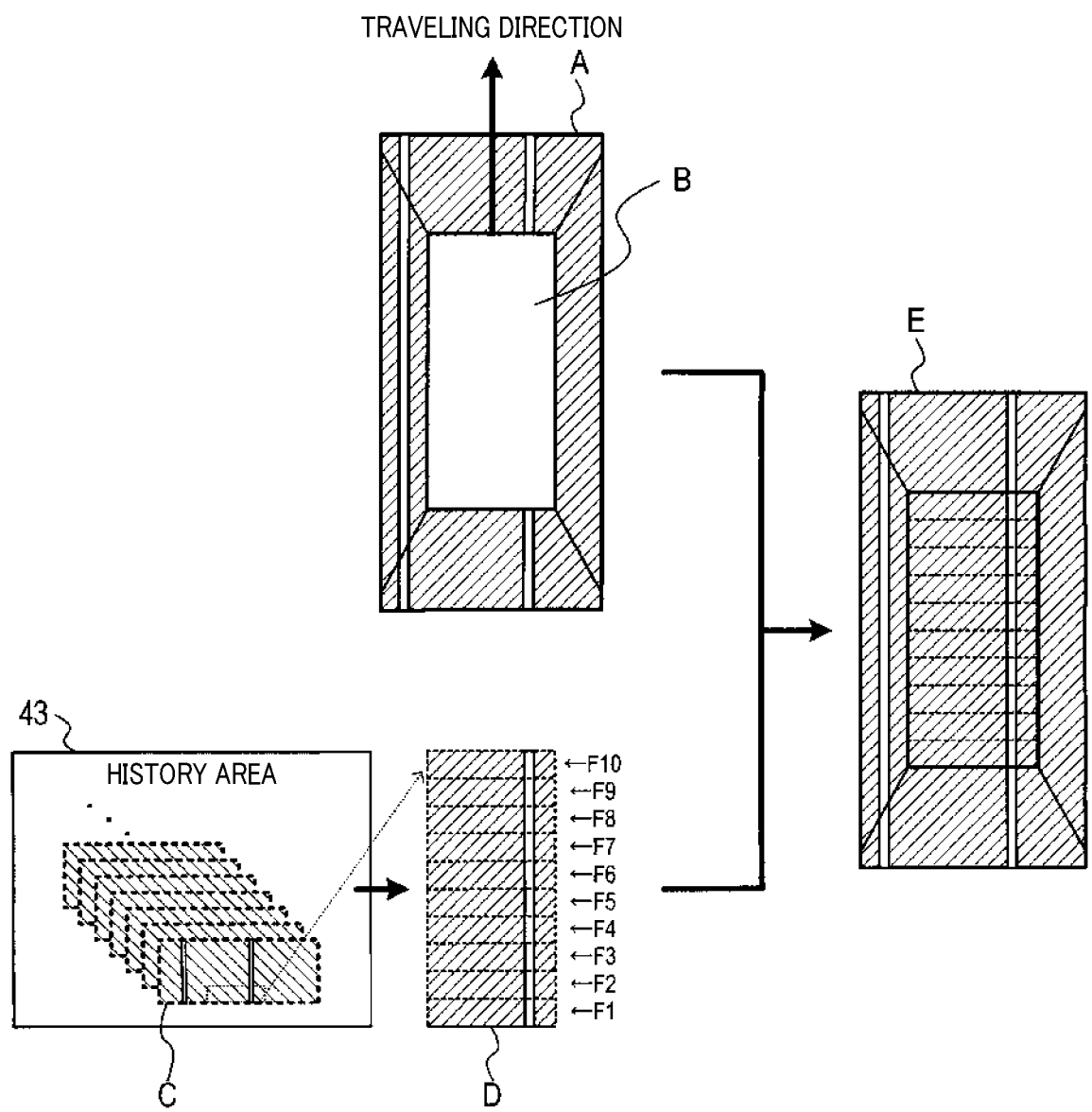
FIG. 3 is an explanatory diagram illustrating a method of synthesizing a display bird's-eye image in a normal state.

In the example in FIG. 3, the supplementary image D is created by sequentially joining the areas F1 to F10 extracted from the respective history images successively acquired at each frame timing along the traveling direction of the host vehicle. Then, the display image creating unit 29 combines the display bird's-eye view image E by fitting the supplementary image D in the non-imaging area B in the real time image A as illustrated in the example in FIG. 3.

Figure 2:
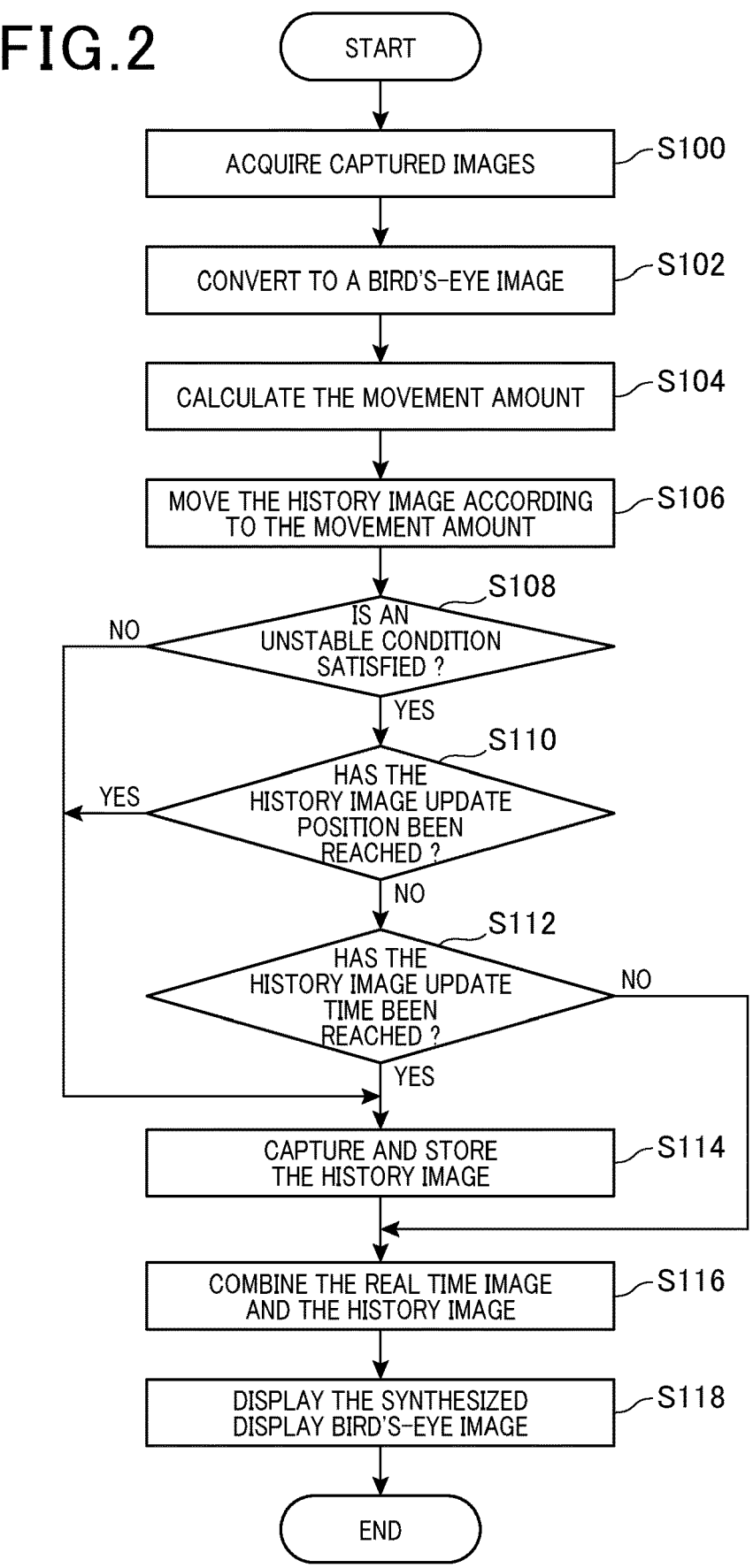
FIG. 2 is a flowchart illustrating the procedure of a display control process.

The explanation will continue with a description of the flowchart of FIG. 2. In S118, the image processing unit 13 outputs the display bird's-eye image stored in the output area 45 of the storage unit 15 to the display device 7 via the output signal processing unit 17, and displays the display bird's-eye image on the display device 7. Note that S118 is a process executed as a function of the display processing unit 31. After S118, the image processing unit 13 ends the display control process at the current frame timing and resumes the process from S100 at the next frame timing.

On the other hand, in a case where it is determined in S108 that an unstable condition is satisfied (S108: YES), the image processing unit 13 moves the process to S110. In step S110, for the latest history image accumulated in the history area 43, the image processing unit 13 determines whether the relative position of the imaging region of the history image with respect to the host vehicle has reached a predetermined history image update position. This history image update position is a predetermined position with reference to the non-imaging area corresponding to the position of the host vehicle, and is predetermined in accordance with the traveling direction (in other words, forward or reverse) of the host vehicle. Note that S116 is a process executed as a function of the image acquiring unit 35.

In a case where the imaging region of the latest history image has not reached the history image update position (S110: NO), the image processing unit 13 moves the process to S112. In S112, the image processing unit 13 determines whether the history image update time has been reached. This history image update time regulates the time period during which the history image to be updated is at an unstable time. The history image update time is set at timing when a predetermined time has elapsed since the last time the history image was updated. However, it is presumed that the cycle of the history image update time is set to be a longer time interval than the standard cycle for updating the history image at the normal time. Note that S116 is a process executed as a function of the image acquiring unit 35.

In a case where the history image update time has not been reached (S112: NO), the image processing unit 13 skips S 114 and moves the process to S116. After that, the image processing unit 13 creates a display bird's-eye view image in S116, outputs the display bird's-eye view image in S118, and then ends the display control process at the current frame timing.

On the other hand, in a case where it is determined in S110 that the imaging region of the latest history image has reached the history image update position (S110: YES), or in a case where it is determined that the history image update time has been reached (S112: YES), the image processing unit 13 moves the process to S114. After that, the image processing unit 13 acquires a new history image in S114. Then, the image processing unit 13 creates a display bird's-eye view image in S116. After outputting the display bird's-eye view image in S118, the image processing unit 13 ends the display control process at the current frame timing.

As described above, in the present embodiment, in a situation where an unstable condition such as traveling on a bad road or skidding is satisfied, the history image is not updated as long as the imaging region has not moved a certain distance, or the history image update time has not been reached. As a result, the cycle during which the history image is updated is delayed as compared with the case during normal traveling. Here, an example in which the display image creating unit 29 creates a display bird's-eye image in a situation where an unstable condition is satisfied will be described with reference to FIG. 4. FIG. 4 schematically illustrates the transition of the positional relationship between real time images A0 to A7, which are captured bird's-eye images acquired at respective times, and history images acquired during this period, for successive times T0 to T7 at each frame timing.

As illustrated in the example in FIG. 4, it is presumed that the image processing unit 13 acquired the history image C0 from the imaging region on the front side in the traveling direction indicated by the arrow at time T0. Note that in FIG. 4, reference numeral 50 indicates a history image update position. Moreover, reference numbers B0 to B7 are non-imaging areas distributed in the center of the real-time images A0 to A7 at the respective times and indicate regions hidden underneath the host vehicle. In the example in FIG. 4, the history image update position 50 is set at a position advanced from the tip-end portion on the traveling direction side of the non-imaging areas B0 to B7 by just the same distance as the length of the imaging region of the history image in the direction opposite to the traveling direction. However, this distance is based on the premise that the distance is sufficiently longer than the traveling distance of the host vehicle during the period of one cycle in which the captured image is inputted.

In the periods at the next times T1, T2, and T3, the position of the history image C0 relative to the host vehicle changes as the vehicle moves. The image processing unit 13 creates display bird's-eye images at the times T1, T2 and T3 by combining partial areas overlapping the non-imaging areas B1 to B3 from the history image C0 as supplementary images with the real time images A1 to A3 at the respective times. However, in the periods at times T1 to T3, no new history images are acquired. As a result, the region of the image synthesized from the last acquired history image C0 for the non-imaging area gradually expands.

At the next time T4, as the imaging region of the history image C0 reaches the history image update position 50, the image processing unit 13 acquires the next history image C4. In addition, at each time T4, the image processing unit 13 creates a display bird's-eye image by combining a partial area overlapping the non-imaging area B4 from the history image C0 as a supplementary image with the real time image A4.

In the periods of the next times T5, T6, and T7, the relative positions of the history images C0, C4 with respect to the host vehicle change as the vehicle moves. The image processing unit 13, at each of the times T4, T5, and T6, creates a display bird's-eye image by combining the partial areas overlapping the non-imaging areas B5 to B7 from the history images C0 and C4 as supplementary images with the real time images A5 to A7 at each time. However, in the periods at times T5 to T7, since the last acquired history image C4 has not yet reached the history image update position 50, no new history image is acquired. As a result, the region of the image synthesized from the last acquired history image C4 for the non-imaging area gradually expands.

[Effect]

With the display control device 9 of the embodiment, the following effects are obtained.

In a situation where the behavior of the vehicle is unstable such as when traveling on a bad road, when skidding, or the like, the timing for updating the history image can be made to be later than in a normal state. By doing like this, the region synthesized from history images captured at the same time for the non-imaging area becomes wider than at a normal time, and the number of times the history images captured at different times are joined is reduced. Therefore, it is possible to suppress discontinuity of images of a road surface rendered in a non-imaging area in a synthesized display bird's-eye image.

Moreover, in a situation where the behavior of the vehicle is unstable, the timing of updating the history image can be determined by the amount of movement of the host vehicle and the time interval. In this way, it is possible to update the history image in a flexible manner according to the movement state or the like of the host vehicle.

[Variation]

The functions of one constituent element in each of the above-described embodiments may be shared among a plurality of constituent elements or a function of a plurality constituent elements may be displayed by one constituent element. In addition, part of the configurations of the above-described embodiments may be omitted. Moreover, at least a part of the configuration of each of the above-described embodiments may be added, replaced, or the like with the configuration of other embodiments described above. Incidentally, all aspects included in the technical concept specified from the language described in the claims are embodiments according to the present disclosure.

The technique according to the present disclosure may be realized by various forms of a system having the display control device 9 described above as an element, a program for causing a computer to function as the display control device 9, a substantive recording medium such as a semiconductor memory in which this program is recorded, a display control method, and the like.

In the above-described embodiment, an example is described in which a captured bird's-eye image is created from images captured by four cameras 2 to 5. The technique according to the present disclosure is not limited to this, and configuration is also possible in which a bird's-eye view image may be created based on images captured with fewer than or more than four cameras.

In the above-described embodiment, an example is described in which in the display control process, both the process of S110 of determining whether a history image has reached an update position, and the process of S112 of determining whether the history image update time has been reached are performed. The present invention is not limited to this, and configuration is possible in which only one of S110 and S112 is performed.

The invention claimed is:

1. A display control device comprising:
 a captured image acquiring unit configured to periodically acquire captured images that are images captured in a imaging region surrounding a vehicle by one or a plurality of cameras mounted on a vehicle;

a bird's-eye view converting unit configured to sequentially create captured bird's-eye images that are bird's-eye views of the surroundings of the vehicle by performing bird's-eye view conversion on captured images periodically acquired by the captured image acquiring unit;

a history image acquiring unit configured to acquire a history image that is a bird's-eye image corresponding to a predetermined area ahead in a traveling direction of the vehicle, among the captured images acquired by the captured image acquiring unit, at a timing determined according to a predetermined condition;

a history image storage unit configured to store at least one history image acquired by the history image acquiring unit;

a movement amount calculating unit configured to calculate a movement amount of the vehicle based on information representing a behavior of the vehicle;

a display image creating unit configured to create a display bird's-eye image as a bird's-eye image for display by extracting an area corresponding to a non-imaging area that corresponds to a region not included in the imaging region of the cameras in a latest captured bird's-eye view image from among the history images stored in the history image storage unit for the non-imaging area based on the movement amount calculated by the movement amount calculating unit, and combining the area extracted with the non-imaging area;

a display processing unit configured to display the display bird's-eye image created by the display image creating unit on a display device provided in the vehicle; and a determining unit configured to determine whether the behavior of the vehicle corresponds to an unstable state based on state information representing a state of the vehicle, wherein in a condition that is determined by the determining unit not to correspond to the unstable state, the history image acquiring unit is configured to acquire the history image from a latest captured bird's-eye image at every predetermined first cycle corresponding to a cycle during which captured images are captured by the cameras, and in a condition that is determined by the determining unit to correspond to the unstable state, the history image acquiring unit is configured to acquire the history image from the latest captured bird's-eye image at a later timing than the predetermined first cycle.

2. The display control device according to claim 1, wherein in a condition that is determined by the determining unit to correspond to the unstable state, the history image acquiring unit is configured to acquire a next history image from the latest captured bird's-eye image when an imaging region in which a latest history image stored in the history image storage unit appears reaches a predetermined update position with respect to the non-imaging area in the latest captured bird's-eye image as the vehicle moves.

3. The display control device according to claim 1, wherein in a condition that is determined by the determining unit to correspond to the unstable state, the history image acquiring unit is configured to acquire a next history image from the latest captured bird's-eye image when a predetermined update time that is longer than the predetermined first cycle has elapsed from the last time a history image was acquired.

4. The display control device according to claim 1, wherein the determining unit is configured to determine that a state corresponds to the unstable state in a condition where a road on which the vehicle is traveling is a bad road, or where slipping of the vehicle is detected.

5. A display control device for displaying an image of a surroundings of on a display device provided in the vehicle, the display control device comprising:

a processor;

a non-transitory computer-readable storage medium; and a set of computer-executable instructions stored on the non-transitory computer-readable storage medium that cause the processor to:

periodically acquire captured images, which are images captured in a imaging region surrounding the vehicle by one or a plurality of cameras mounted on a vehicle;

sequentially create captured bird's-eye images, which are bird's-eye views of the vehicle's surroundings by performing bird's-eye view conversion on captured images periodically acquired;

acquire a history image, which is a bird's-eye image corresponding to a predetermined area ahead in a traveling direction of the vehicle, among the captured images acquired at a timing determined according to a predetermined condition;

store at least one history image;

calculate a movement amount of the vehicle based on information representing a behavior of the vehicle;

create a display bird's-eye image as a bird's-eye image for display by extracting an area corresponding to a non-imaging area that corresponds to a region not included in the imaging region of the cameras in a latest captured bird's-eye view image from among stored history images for the non-imaging area based on the movement amount calculated, and combining the area extracted with the non-imaging area;

display the display bird's-eye image on the display device provided in the vehicle; and determine whether the behavior of the vehicle corresponds to a specific unstable state based on state information representing a state of the vehicle, wherein in response to determining that the behavior of the vehicle does not correspond to the specific unstable state, the processor acquires the history image from a latest captured bird's-eye image at every predetermined first cycle corresponding to a cycle during which captured images are captured by the cameras, and in response to determining that the behavior of the vehicle corresponds to the specific unstable state, the processor acquires the history image from the latest captured bird's-eye image at a later timing than the predetermined first cycle.

6. A method for displaying an image of a surroundings of a vehicle on a display device provided in the vehicle, the method comprising:

periodically acquiring captured images, which are images captured in a imaging region surrounding the vehicle by one or a plurality of cameras mounted on a vehicle;

sequentially creating captured bird's-eye images, which are bird's-eye views of the vehicle's surroundings by performing bird's-eye view conversion on captured images periodically acquired;

acquiring a history image, which is a bird's-eye image corresponding to a predetermined area ahead in a traveling direction of the vehicle, among the captured images acquired at a timing determined according to a predetermined condition;

storing at least one history image;

calculating a movement amount of the vehicle based on information representing a behavior of the vehicle;

creating a display bird's-eye image as a bird's-eye image for display by extracting an area corresponding to a non-imaging area that corresponds to a region not included in the imaging region of the cameras in a latest captured bird's-eye view image from among stored history images for the non-imaging area based on the movement amount calculated, and combining the area extracted with the non-imaging area;

displaying the display bird's-eye image on the display device provided in the vehicle; and determining whether the behavior of the vehicle corresponds to a specific unstable state based on state information representing a state of the vehicle, wherein in response to determining that the behavior of the vehicle does not correspond to the specific unstable state, the history image is acquired from a latest captured bird's-eye image at every predetermined first cycle corresponding to a cycle during which captured images are captured by the cameras, and in response to determining that the behavior of the vehicle corresponds to the specific unstable state, the history image is acquired from the latest captured bird's-eye image at a later timing than the predetermined first cycle.

* * * * *